United States Patent [19]

Polster

[11] Patent Number: 5,916,617
[45] Date of Patent: Jun. 29, 1999

[54] PROCESS FOR HEAT TREATING FOOD PRODUCT

[76] Inventor: Louis S. Polster, 2205 Marthas Rd., Alexandria, Va. 22307

[21] Appl. No.: 08/640,746

[22] PCT Filed: Nov. 7, 1994

[86] PCT No.: PCT/US94/12790

§ 371 Date: Jun. 28, 1996

§ 102(e) Date: Jun. 28, 1996

[87] PCT Pub. No.: WO95/12320

PCT Pub. Date: May 11, 1995

Related U.S. Application Data

[63] Continuation-in-part of application No. 08/148,915, Nov. 5, 1993, Pat. No. 5,494,687.

[51] Int. Cl.⁶ .............................. A23L 3/10; A23B 5/005
[52] U.S. Cl. ......................... 426/521; 426/520; 426/300; 426/407; 426/412
[58] Field of Search .................................. 426/407, 412, 426/520, 521, 298, 300

[56] References Cited

U.S. PATENT DOCUMENTS

| | | | |
|---|---|---|---|
| 2,423,233 | 7/1947 | Funk | 99/161 |
| 2,565,311 | 8/1951 | Koonz et al. | 99/161 |
| 2,713,002 | 7/1955 | Williams . | |
| 3,262,787 | 7/1966 | Ellis | 99/174 |
| 3,445,240 | 5/1969 | Bedrosian et al. | 99/107 |
| 3,552,297 | 1/1971 | Williams | 99/271 |
| 3,663,233 | 5/1972 | Keszler | 99/107 |
| 3,949,114 | 4/1976 | Viola et al. | 428/337 |
| 3,961,086 | 6/1976 | Turbak | 426/240 |
| 3,961,090 | 6/1976 | Weiner et al. | 426/281 |
| 3,966,980 | 6/1976 | McGuckian | 426/393 |
| 3,983,258 | 9/1976 | Weaver | 426/307 |
| 3,988,499 | 10/1976 | Reynolds | 428/474 |
| 4,132,048 | 1/1979 | Day | 53/434 |
| 4,136,205 | 1/1979 | Quattlebaum | 426/412 |
| 4,233,323 | 11/1980 | Sway et al. | 426/55 |
| 4,346,650 | 8/1982 | Zaitsu | 99/361 |
| 4,534,984 | 8/1985 | Kuehne | 426/412 |
| 4,808,425 | 2/1989 | Swartzel et al. | 426/399 |
| 4,983,411 | 1/1991 | Tanaka et al. | 426/234 |
| 5,283,072 | 2/1994 | Cox et al. . | |
| 5,290,583 | 3/1994 | Reznik et al. | 426/614 |
| 5,431,939 | 7/1995 | Cox et al. . | |
| 5,445,062 | 8/1995 | Polster | 99/348 |
| 5,494,687 | 2/1996 | Polster | 426/55 |
| 5,589,211 | 12/1996 | Cox et al. | 426/298 |

FOREIGN PATENT DOCUMENTS

| | | |
|---|---|---|
| 668554 | 8/1963 | Canada . |
| WO 97/07691 | 3/1997 | WIPO . |

OTHER PUBLICATIONS

The Meat Handbook, Albert Levie, AVI Publishing Co., Inc., Westport, CT, 1963, pp. 44–45.
R. A. Lawrie, Meat Science, 2d Ed., Pergamon Press New York, 1974, pp. 224–225.
Water Convection Oven Brochure, Oliver Products Company, May 1993.
E.M. Funk, Stabilizing Quality in Shell Eggs, University of Missouri, College of Agriculture, Agricultural Experiment Station, Research Bulletin 362, pp. 1–38 (Apr. 1943).

*Primary Examiner*—Donna C. Wortman
*Assistant Examiner*—Brenda G. Brumback
*Attorney, Agent, or Firm*—Oliff & Berridge, PLC

[57] ABSTRACT

Proteinaceous food product is heated by immersing the product in a liquid bath and maintaining the bath at a controlled temperature within a range that treats the proteinaceous food product without substantial loss of functionality.

41 Claims, No Drawings

PROCESS FOR HEAT TREATING FOOD PRODUCT

This application is the national stage of International Application no. PCT/US94/12790, filed Nov. 7, 1994, and thus a continuation-in-part of U.S. patent application Ser. No. 08/148,915, filed Nov. 5, 1993 (now U.S. Pat. No. 5,494,687).

BACKGROUND OF THE INVENTION

This invention relates to a process for heat treating food product. The process is advantageously used for pasteurizing and/or tenderizing proteinaceous food product.

Pasteurizing of proteinaceous food product can be carried out by heating to destroy infectious organisms such as salmonella. Pasteurization may be defined as heat treatment for the purpose of killing or inactivating disease-causing organisms. For example for milk, a minimum exposure for pasteurization is 62° C. for 30 minutes or 72° C. for 15 seconds. The latter exposure is called flash pasteurization. Complete sterilization may require ultra-high pasteurization such as treatment at 94° C. for 3 seconds to 150° C. for 1 second to kill pathogenic bacteria and inactivate enzymes that cause deterioration and to provide for satisfactory storage life.

Minimum food safety processing standards for various commodities have been promulgated and are enforced by the United States Department of Agriculture (USDA). Pasteurization may be defined in accord with the standards mandated by the USDA. The Nutrition Action Health Letter published by the Center For Science In The Public Interest (July/August 1991 Edition, Vol. 18, No. 6, "Name Your (Food) Poison") describes concern with the growing number of cases of food poisoning due to food infections.

Many known processes for pasteurizing food are insufficient to assure safety of some foods from infections or cannot be applied to some food products. The "Name Your (Food) Poison" article reports that dairy products, eggs, poultry, red meat and seafood, in that order are the most common causes of food poisoning. Shell eggs are particularly difficult to pasteurize because of their structure. The article indicates that one of 10,000 eggs is contaminated with salmonella enteritis.

U.S. Pat. No. 4,808,425 to Swartzel et al. teaches a method of "ultrapasteurizing" a liquid whole egg product". The liquid whole egg product is passed as a continuous stream through a pasteurizing apparatus. The liquid whole egg product is heated to a predetermined real temperature by contacting the product with a heated surface. The total thermal treatment received by the whole egg product is prescribed by an equivalent temperature and an equivalent time that are defined to pasteurize the material but insufficient to cause coagulation (loss of functionality) of product.

U.S. Pat. No. 5,290,583 to Reznik et al. relates to an electroheating process for treating liquid egg. The process comprises the steps of electroheating the liquid egg with an AC electric current having a frequency effective to heat the liquid egg without electrolysis at a rate to avoid detrimental coagulation (loss of functionality). The liquid egg is held at a temperature sufficient to achieve pasteurization.

Functionality or functional properties of eggs relate to the volume, structure, texture and keeping quality of baked products produced by the eggs. Functionality is defined herein as the capability of a proteinaceous food product to provide the properties of the product that has not been treated by the process of the present invention. Loss of functionality is determined by observing the loss of quality of the food product. For example, spoilage or cooking is a loss of functionality of meat in a process designed for aging of meat without cooking. Coagulation is a loss of functionality of shell eggs during pasteurization. Cooking and/or loss of taste or texture is a loss of functionality of oysters that are to be eaten uncooked.

The extent to which functional properties of a proteinaceous food product are affected by heating may be determined by testing the performance of the product under conditions in which the damage is readily observed. For example, functionality of eggs can be established by determining the quality of food products that depend upon the quality of coagulation of the egg. Such food products may include custards and pie fillings and loaves or croquettes which depend upon the binding of food together that may be provided by the quality of egg coagulation. The functional properties may also include the elasticity of an egg protein film or the emulsifying ability to disperse oil in the making of mayonnaise and salad dressings. Functionality or functional properties of other food product are similarly established in terms of the capability of the food product to perform intended purposes after heat treatment including retaining a "natural" taste and texture.

While heat treatment may be effective in pasteurizing proteinaceous food product, heating at the same time may destroy some functionality or functional properties of the product. The present invention provides a process for heat treating proteinaceous food product that achieves a delicate balancing of effective heat treatment without destruction of functionality or functional properties.

The heat treating process of the present invention also provides a method of quick aging of meat by exposure to an elevated temperature without decomposition of the food product by cooking. Aging a meat can be carried out by storing pieces of meat in a refrigerated space for a time sufficient to permit natural enzymes to complete a tenderizing process. Enzymes in the meat continue to function post-mortem to catalyze the hydrolysis of collagen and other proteins. The enzymes break down connective tissue so that the meat becomes tender and flavorful. After aging, the texture of the meat is more acceptable to the consuming public.

During aging, the meat is generally refrigerated at a temperature of about 34° F. to suppress bacterial growth and at a relative humidity of about 80% to suppress mold growth. However at these conditions, the rate of enzymatic action is suppressed. An average of twenty-one days or more is often required to obtain satisfactory tenderizing. Substantial space in a refrigeration facility is required to store the meat for this period of time.

Increasing the temperature used in the aging process accelerates activity of the enzymes for tenderizing meat. However, bacterial activity is also increased. Slime growth, putrefaction and mold growth result in spoilage and can cause a substantial loss of usable meat. Maintaining low humidity in the refrigerated space to retard mold growth tends to desiccate and discolor meat. The desiccated and discolored parts must be trimmed. Additionally, low humidity causes shrinkage.

U.S. Pat. No. 2,713,002 to Williams proposes aging meat by storing a carcass in the presence of ultra-violet radiation. The carcass is wrapped in a combination of absorbent material with a moisture-vapor-permeable, pliable, extensile film. The meat is wrapped in the film and held under ultraviolet radiation for five, ten, fifteen or twenty days at between 30° F. to 40° F.; for five or ten day periods at 47° F.; for two, three or five days at 60° F.; or for one or two days at 70° F. The covered meat is initially chilled in a cooler at a temperature of about 30° to 45° F. A period of twenty-four to seventy-two hours is required to bring the meat to an initial chill temperature for aging of about 30° F. to 35° F.

U.S. Pat. No. 3,445,240 to Bedrosian et al. discloses tenderizing meat by storage under specific controlled chilled conditions and for definite periods of time in an atmosphere containing controlled amounts of oxygen and carbon dioxide at a high humidity.

U.S. Pat. No. 3,552,297 to Williams relates to an apparatus for aging and flavoring meat at a temperature of around 65° F. to 75° F. The apparatus includes a germicidal lamp and a timer motor for setting the aging process for a period of one to four days. The aging process is conducted in the presence of Thamnidium, an anti-bacteria agent.

U.S. Pat. No. 3,663,233 to Keszler teaches a process of tenderizing and cooking meat products by pumping the beef with a liquid tenderizing agent. The beef is heated to a constant temperature and maintained at such temperature to allow tenderizing by the tenderizing agent. The temperature is then raised to cook the meat.

U.S. Pat. No. 3.961,090 to Weiner et al. teaches pumping an aqueous solution into a piece of uncooked beef, vacuum sealing the beef in a bag and cooking the beef "to attain a maximum internal temperature of 131° to 140° F."

U.S. Pat. No. 3,966,980 to McGuckian discloses a method of cooking foods in vacuum packages in a thermostatically controlled hot water bath followed by quick chilling and storage at 28° F. to 32° F. The bath is maintained in a range between 140° F. to 212° F. to cook the meat at least to a "rare" state. The cooked food is thereafter quick chilled for storage. A disclosed advantage of the process is that the meat may be enzymatically tenderized while it is being cooked.

U.S. Pat. No. 4,233,323 to Sway et al. discloses a tenderization process of exposing meat to ultraviolet rays of high intensity.

U.S. Pat. No. 4,346,650 to Zaitsu discloses a bath for sterilizing and cooking food. The process is a two-step process requiring sterilization at about 105° C. (221° F.) to about 140° C. (284° F.). The bath sterilizes and cooks packaged foods.

U.S. Pat. No. 4,983,411 to Tanaka et al. relates to an apparatus used for ultraviolet sterilization and shrink film packaging food. In the packaging step, the food is sprinkled with hot water.

A process of heat treating proteinaceous food product below a cooking temperature by exposure to an elevated temperature is desirable for pasteurizing, aging or both pasteurizing and aging the food product. However, elevated temperatures for periods required to pasteurize food material or to age food material can cause decomposition, i.e., loss of functionality or cooking. Elevated temperatures at shorter periods of time may not accomplish pasteurization or aging or may stimulate bacteria growth causing spoilage.

SUMMARY OF THE INVENTION

The present invention relates to a process of heat treating proteinaceous food product by immersing the product in a liquid bath and maintaining the entire volume of the bath at a controlled temperature within a range of ±2° F. The process heat treats the proteinaceous food product without substantial loss of functionality. The process can be used to effectively pasteurize or tenderize or otherwise treat proteinaceous food product.

DETAILED DESCRIPTION OF PREFERRED EMBODIMENTS

The process of the invention permits heat treating food product within an abbreviated period of time to provide pasteurization, tenderizing or both pasteurizing and tenderizing. The process comprises immersing the food product in a liquid bath such as a water bath. The entire volume of the bath is maintained at a controlled temperature within a range that pasteurizes the food product without destroying functionality or that hastens enzymatic tenderizing of a food product but does not substantially cook the meat.

The heat treatment process of the present invention is particularly useful for pasteurizing food product such as seafood (e.g., fin fish and shellfish such as oysters, claims, scallops, mussels, crabs) and shell egg among many others. Shell egg may present a particular problem of infection. One source of infection may arise from the fact that egg shells have numerous pores that permit the egg to breathe. Pore holes vary in size. When the egg is laid, the holes come in contact with infections in the environment outside of the egg. Some of the infections may be in the form of microbes that are of a size that fit through the pores. Inside the egg, the microbes are not uniformly spread but are retained in small patches on the inner shell membrane that has pores that are smaller than the shell. Additionally, airborne microorganisms may invade an egg as a contaminant during gas and vapor exchange. Additionally, eggs can be contaminated by a transovarian infection.

Swartzel et al. describes USDA standards for pasteurizing liquid eggs. The minimum times for temperature processing required by USDA standards produces liquid eggs that are safe to eat while at the same time an acceptable degree of functionality is retained. However, standards for shell eggs are not available because no reliable temperature technique for treating shell eggs is known. Shell eggs present a particular problem of pasteurization because the shell egg is made up of diverse materials. An effective temperature treatment must expose all of the shell, the outer shell and egg membranes, the albumen layer or egg white, the chalaza, the vitelline membrane and the yolk to temperatures for times to adequately destroy the undesired organisms without destroying functionality.

To achieve these objectives, the shell egg may be exposed to a prepasteurization temperature of 45° F. or higher followed by exposure to temperatures from about 125° F. to near, but less than, 140° F. Another processing technique includes first processing at an elevated temperature near to 140° F. followed by a lowering of temperature to a processing temperature at the lower end of the effective pasteurization temperature range.

If temperatures are significantly above 139° F., the egg shell may crack and whites may begin to coagulate before the yolk has been pasteurized. At temperatures below the specified minimum, salmonella and other harmful microorganisms, including molds, bacteria and viruses, may not be effectively destroyed.

Processing times at these temperatures required for meeting minimum USDA requirements for liquid eggs range from a minimum processing time of about 20 minutes to a processing time of 345 minutes. Preferred temperatures include a range of 135° F. to 138 or 139° F. These time and temperature relationships are effective for pasteurization processing of whole shell eggs once an adequate prepasteurizing processing temperature is achieved within the center of the whole shell egg of between about 38° F. to about 60° F. The average first preprocessing temperature should be lower than about 45° F. for whole shell eggs for consumer distribution.

The time and temperature relationships for pasteurizing shell eggs are determined in respect to the following factors: (1) temperatures attained by all material within the mass of the shell egg and the time for pasteurizing of the material at that temperature; and the average time that each material is heated to assure that each material is subjected to the least minimum condition to effectively pasteurize; and (2) the combination of processing parameters that will retain functionality by avoiding or minimizing adverse changes in appearance and performance while maximizing destruction of infections.

The following table provides temperature and real processing time (RPT) relationships for destruction of harmful microorganisms in shell eggs:

TABLE 1

| Temperature | | RPT (minutes) |
|---|---|---|
| 130° F. | (54.4° C.) | = 65 |
| 131° F. | (55.0° C.) | = 49 |
| 132° F. | (55.6° C.) | = 38 |
| 133° F. | (56.1° C.) | = 28 |
| 134° F. | (56.7° C.) | = 20 |
| 135° F. | (57.2° C.) | = 16 |
| 136° F. | (57.8° C.) | = 11 |
| 137° F. | (57.8° C.) | = 8 |
| 138° F. | (58.9° C.) | = 4.75 |
| 140° F. | (60.0° C.) | = 3.5 |

These relationships describe processing of whole shell eggs after attaining required pasteurizing preprocessing temperature. The initial preprocessing temperature is applied until the shell egg reaches a temperature equilibrium with the heat transfer medium. The relationships of Table 1 are applicable after this point has been reached. The processing temperature is defined as an equilibrium temperature where heat has been transferred through external portions of the shell egg into the center of the yolk so that the temperature at the yolk center and at every other locus throughout the mass of the egg has reached an equilibrium with the process medium.

Treatment times include processing times (RPT) from Table 1 plus the time required for the egg to reach the preprocessing temperature. Certain factors may effect the time required for an egg to reach the effective process temperature, including egg size, the temperature of the egg before application of heating and the selected pasteurization process temperature. It is important that all of the egg be held at an appropriate temperature for an appropriate time to ensure pasteurization of entire egg and that this can be accomplished without simultaneous cooking or disruption of functionality of any portion of the egg.

In a preferred embodiment, the heat treatment is carried out in at least two steps. The process comprises a first heat treating at a temperature to provide an internal egg temperature to destroy infectous organisms without substantial loss of functionality. The first heat treating is followed by a second heat treating at a lower temperature to achieve pasteurization. The steps combine to advantageously pasteurize shell egg without loss of functionality.

Advantageously, the process of the invention permits aging (tenderizing) of meat within an abbreviated period of time in the absence of a chemical tenderizing agent and preferably also in the absence of an anti-bacteria agent. The process comprises immersing the meat in a liquid bath such as a water bath. The entire volume of the bath is maintained at a controlled temperature within a range that hastens the enzymatic tenderizing of the meat. The temperature is preferably below a minimum cooked temperature of the meat, preferably at a temperature that kills bacteria in at least the initial stages of the process. The meat is held at the bath temperature during tenderization. The process of this invention permits the tenderized meat to be chilled, stored, and/or distributed and later cooked for serving.

Cooking uses heat to substantially decompose and change fibers of meat. Cooking adds texture and flavor and prepares the meat for human consumption. The term minimum cooked temperature for a meat as used herein is a minimum temperature that a meat attains in preparation of the meat for human consumption as cooked meat.

The process of the invention can be applied to the aging of different types of meat, for example, beef, veal, pork, mutton, lamb or poultry, most preferably beef. Cooked temperatures for various meats are known. Typical minimum cooked temperatures for typical meats are as follows: rare beef-140° F.; veal-175° F.; lamb-160° F.; pork 175° F.; poultry 160° F. Thus suitable temperatures below the minimum cooked temperature of the meat for use in the present invention include temperatures less than or equal to 133° F., such as 130° F., 125° F. or 120° F. for beef. For other meats, the tenderizing temperature is kept under 160° F., preferably under 150° F. or 145° F., to avoid inactivation of enzymes.

Various sizes of meat can be tenderized by the process of the present invention. For example, very large sizes such as carcasses, primal cuts and whole muscle meat as well as various smaller sizes of meats can be tenderized by the process of the invention. Suitable periods of time for conducting the process of the invention to obtain tenderizing of meat will vary with the type of the meat once the meat has reached a uniform temperature. In general, the meat should be maintained in the bath long enough to reach a uniform temperature throughout its thickness, and long enough thereafter to reach the desired degree of tenderness. To expedite transfer of the bath temperature throughout larger cuts of meat, one can insert one or more heat conductors, for example aluminum spike(s), in the meat, taking care that they are inserted in a manner that will not cause perforation of any envelope around the meat.

According to a process of the invention, the entire volume of the bath is maintained at a controlled temperature within a range that hastens enzymatic tenderizing of the particular meat below a minimum cooked temperature of the meat. Thus in this preferred embodiment, the bath does not include even localized areas of liquid at or above the minimum cooked temperature. In embodiments, the process comprises immersing or spraying the meat in or with liquid or a liquid vapor such as steam at a first temperature within a range that quickly kills surface bacteria without substantially cooking the surface of the meat. The meat is then maintained in a liquid bath at a second temperature lower than the first temperature within a range that hastens enzymatic tenderizing of the meat.

According to a preferred process of the present invention, the entire volume of the bath is maintained at a controlled temperature within a range of ±2° F. The process of the invention preferably comprises immersing food product in a liquid bath and maintaining the bath within a very closely controlled temperature range, for example by heating laterally adjacent zones of the fluid and vertically perturbating the fluid, such as with a liquid jet or with bubbles. A suitable thermalizing apparatus for heat treating food product according to the present invention including maintaining the bath temperature by heating laterally adjacent zones of fluid and vertically perturbating the fluid with bubbles is disclosed in U.S. Pat. No. 5,445,062 to Polster entitled "Rethermalizer." The entire disclosure of this Patent is incorporated herein by reference.

The rethermalizer is a food heating vessel having sides and a bottom for retaining an aqueous bath, and including heat supply for heating the bath. A food locator rack is positioned in the vessel. The rack has a plurality of defined locations for supporting food product to be heated. Fluid outlets are positioned from the rack to the vessel beneath all of the locations to cause fluid to exit into the bath and agitate the bath over and past the food items. A connector connects the rack outlets to a pressurized source of fluid. The rethermalizer includes fluid conducting tubes with outlets on the locator rack and upwardly diagonally oriented conduits to conduct pressurized fluid to cause bath circulation. The heat supply is a heater element embedded in rubber-type material, for example silicone polymer, bonded to outside of the vessel. The heater element can be an electric resistance heater coil embedded between layers of the rubber-type material.

The rethermalizer includes water supply means for supplying additional water to the vessel to replace water lost by evaporation and removal with food product. Sensing elements are spaced at different vertical locations of the vessel with an upper one at the level desired for the bath and a lower one below that level for detecting the differential sensed by the elements. The sensing elements are operably associated with the water supply means for periodically actuating the water supply means to add supplemental water to the vessel when a predetermined differential is detected. The rethermalizer can include a graphic control panel with the panel having controls and indicators for each of food support locations.

The housing for the rethermalizer can define a heating chamber and a separate control chamber. The food heating vessel is in the heating chamber and electronic controls are located in the control chamber. Two walls between the chambers are spaced from each other and define a vertically elongated space. One of the walls is a wall of the heating chamber and the other wall is a wall of the control chamber. Air inlet openings at the bottom of the space provide for inlet air flow. Air outlet openings at the top of the space permit outlet air flow into the heating chamber. Heat from the heating chamber creates thermally-generated, upward air flow through the space to isolate and cool the control chamber wall.

Precise temperature control is critical to high quality results in cooking and rethermalizing vacuum package foods. Precise temperature control is also important to the process of heating food product for pasteurizing proteinaceous food product without destruction of functionality and/or for enzymatic tenderization of proteinaceous food product without substantial cooking according to the present invention.

Heating water or other liquid baths can result in localized too high or too low temperatures throughout the bath that impair food product quality. A stirred liquid bath does not flow evenly over all surfaces, but rather takes a path of least resistance. A liquid bath tends to stratify into thermal layers of different temperatures. Even if heat is applied throughout the surface of a vessel, loading of product into the vessel will cause sometimes widely varying temperature zones to occur. These conditions will prevent accurate temperature control in a hot liquid bath. Inaccurate temperature control within a bath can adversely affect the heat treating of proteinaceous food product. Localized hot spots can cause portions of a shell egg to lose functionality through coagulation or the like and can cause portions of a tenderizing meat to cook. Low temperature zones can result in inadequate pasteurization or tenderization. Low temperature zones can prevent or reduce tenderizing and even enhance bacteria growth.

The present invention includes both batch and continuous heat treating processes. Temperature control in a liquid is more difficult in a continuous heat treating process. Liquid is lost from the bath not only by evaporation, but additionally by significant liquid transfer with product as pasteurized and/or tenderized proteinaceous food product is removed. Liquid is required to be added to a heated bath usually in a significant quantity by the time bath level decline is discovered by a food worker. Addition of liquid can cause temperature change in the bath whether heated or cooled liquid is added. This effect, if not controlled, can adversely influence a heat treating process. Control can be accomplished, however, as discussed below.

Another problem with heating in a liquid bath relates to temperature control techniques. The thermodynamics of a liquid bath create a lag time between the application of heat energy and the sensing of the same by a control system and the establishing of a uniform temperature throughout a bath in response to the setting. The thermodynamics of the liquid and the lag time may result in "overshoot" of temperature.

Liquid circulation can help to prevent temperature layer stratification and overshoot. However, circulation according to conventional bath heating methods is insufficient to provide the control necessary for pasteurization and/or tenderization. Additionally, circulation alone does not assure even flow over all surfaces of food product. The food product itself may disturb the circulation pattern of a bath. The bath liquid will take a path of least resistance and may create localized temperature zones or layer stratification.

Typical thermostatically controlled liquid baths used for cooking exhibit problems of heating and temperature control as described above. Thermostatically controlled liquid baths are characterized by overshoot and localized hot or cold spots. Most thermostatically controlled liquid baths cannot be used in the process of the present invention to maintain the entire volume of the liquid bath at a controlled temperature within a range of ±2° F., much less ±1° F. or less.

The Polster rethermalizer is provided with tubes to generate liquid flow. The tubes can inject bubbles, for example air bubbles, or liquid jets at various locations in the vessel to cause scrubbing of surfaces of meat. The resulting action provides excellent heat exchange at meat surfaces and eliminates temperature zoning and stratification. The vessel permits an accurate and efficient heat transfer to the meat to permit a uniform temperature within the meat without hot or cold spots. The bubbles or jets cause a vertical perturbation that permits utilizing the bath for a process of pasteurization and/or tenderizing without by cooking and without undesirable bacteria growth.

The Polster rethermalizer includes specially arranged and cooperative temperature sensors. The sensors are vertically displaced to provide temperature sensing. Temperature differentials are sensed between different vertical locations within the bath. The rethermalizer vessel is heated in laterally adjacent zones. A temperature sensor is located on the vessel for each zone near the heater to cooperate with sensors near the vessel bottom. The arrangement compensates for lag time, i.e., thermal momentum, and prevents overshoot of temperature above optimum tenderizing temperatures. A vertically displaced set of temperature sensors permits the addition of water in small regular quantities as needed to provide level control.

Adding bath liquid at different temperatures within the liquid bath is another technique that can be used to maintain the liquid bath at a controlled temperature according to the invention. The process of the invention can be used for pasteurization, tenderizing or both pasteurization and tenderizing of proteinaceous food product. Any suitable thermal conveying liquid may be used as the bath liquid in the process of the invention for treating any type of proteinaceous food product. For example, the bath can comprise water or cooking oil. Preferably, the liquid is water. By means of the present process, the temperature of the bath can be maintained at a temperature ±2° F., preferably ±1° F. or ±0.75° F. or 0.5° F. Thus the bath can exclude even localized areas of liquid at or above a temperature that impairs functionality of or cooks the food product, and/or at or below a temperature at which pasteurization is incomplete. to maximize uniform quality of the tenderized meat precut.

The food product can be enveloped in a bag during treatment. If enveloped, the bag preferably is made of a relatively non-insulating material that is substantially impermeable to the liquid of the bath. The material should be impermeable to prevent food product from being permeated by the bath liquid. Additionally, the material must be relatively non-insulating to permit transfer of heat from the bath to the food product. Suitable materials are known to those of ordinary skill in the art, and can include materials such as those used in many cooking bags and wraps. Appropriate materials for enveloping the food product include polymeric laminates that can be comprised of an oxygen barrier layer and a moisture barrier layer. The oxygen barrier layer may comprise a hydrolyzed olefin\vinyl ester copolymer. The oxygen barrier layer may be a heat-sealable layer comprising high density polyethylene, alone or mixed with polyisobutylene; polypropylene; ethylene-propylene copolymers; ionomeric resins; polybutene-1 or blends of such polymers.

The laminate may include a substrate layer comprising a polyamide, which may be a homopolyamide such as polycaprolactam or polyhexamethyleneadipamide or a copolyamide; a polyester such as polyalkylene terephthalate or isophthalate; a polycarbonate; polypropylene; a polyallomer; poly(4-methyl-pentene-1); polybutene-1; polystyrene; polyvinyl chloride; medium or high density polyethylene; an acrylonitrile-butadiene-styrene resin; a methacryonitrile-butadiene-styrene resin or a blend of two or more such polymers. Examples of suitable materials are disclosed in U.S. Pat. Nos. 3,949,114 to Viola et al., 3,961,086 to Turbak, 3,983,258 to Weaver, 3,988,499 to Reynolds, 4,132,048 to Day, 4,136,205 to Quattlebaum and 4,534,984 to Kuehne. The entire disclosures of these patents are incorporated herein by reference.

A process according to the present invention for heat treating meat, comprises encasing the food product in a plastic pouch, evacuating air from the pouch and sealing the pouch under vacuum. According to a preferred embodiment, the process of tenderizing meat in the absence of a tenderizing agent (or anti-bacteria agent), comprises vacuum packaging meat in a pouch, immersing the meat in a liquid bath, and maintaining the bath at a controlled temperature within a range below a minimum cooked temperature of the meat that hastens enzymatic tenderizing in the meat.

The tenderizing process of the invention is particularly advantageous for tenderizing meat either in advance of delivery to a serving area or at the serving area immediately prior to cooking. For example, individual steaks can be tenderized in a restaurant by the process. Additionally, the process of immersing a meat in a liquid bath can be conducted at higher temperatures to cook meat. Meat or fish can be subjected to an elevated temperature outside the immersing vessel and for a brief period of time to provide a grilled appearance or the like.

The pasteurization process of the invention is particularly advantageous for pasteurizing shell egg and "raw" shellfish because the process provides a means to precisely control treatment temperature to achieve pasteurization without destroying functionality of the food. The egg can be heated in the range of 134.5 to 139.5° F. for 20 to 345 minutes. Process time can be controlled in ranges from 34 to 52 minutes for a pasteurization temperature of 138.9±0.5° F. and up to 75 to 400 minutes for a pasteurization temperature of 130.3±0.4° F. The process can be used to treat shell egg at an initial temperature of 40 to 70° F. when the weight of the egg is 35 to 90 grams and to thereafter heat treat the egg at a temperature of 138±1.5° F. for a total time of 36 to 52 minutes. The process can heat treat the egg weighing 50 to 80 grams to an initial temperature in the range of 45 to 55° F. followed by a heat treatment at a temperature of 138±0.75° F. for 39 to 49 minutes.

Times and temperatures for heat treating other proteinaceous products can be the same as for shell eggs or can be determined by those skilled in the art according to the product treated and the objectives of the heat treatment. For example, pasteurization of seafood may be achieved at the same temperature and time relationships described above for shell egg.

While the invention has been described in connection with specific embodiments, it is to be understood that the embodiments are by way of illustration and are not intended to limit the invention. For example, while the invention is described in connection with the rethermalizer vessel disclosed by Polster in U.S. Pat. application Ser. No. 08/065,627, various sizes of meat may require different size vessels or different types of vessels and various quantities of shell eggs may require different size vessels or different types of vessels. An enlarged vessel can be utilized to conduct the process of the invention with larger cuts of meat or an adapted Polster vessel with a separate heat source for tight control of temperature within the required range and/or an outside source of controlled temperature bath liquid can be utilized. An enlarged vessel can be utilized to conduct a process of the invention for a commercial scale processing of shell egg. While the invention is described in connection with the rethermalizer vessel disclosed by Polster and while the invention can be carried out in thermalizer vessels of varying size or Polster thermalizing vessels that may be modified, the process of the invention can be conducted by any suitable apparatus. Additionally, while the focus of the description of pasteurization has been on the shell egg example, the process applies to pasteurization of any proteinaceous food material including by way of example, meat and shellfish. In another example, the invention can be modified to raise the temperature of meat to a pasteurizing or tenderizing temperature and the process can be completed in a convention environment such as in a heated room. In another example, the process can include a spray bath type of immersion.

What is claimed is:

1. A process of heat treating a proteinaceous food product, comprising immersing the product in a bath liquid and maintaining the entire volume of the bath liquid at a controlled temperature within a range of ±2° F. to heat treat said proteinaceous food product without substantial loss of functionality.

2. The process of claim 1, comprising enveloping said proteinaceous food product in a relatively non-insulating material that is substantially impermeable to the liquid of said bath before immersing the proteinaceous food material in the bath.

3. The process of claim 1, comprising encasing the proteinaceous food product in a plastic pouch, evacuating air from the pouch and sealing the pouch before immersing the proteinaceous food material in the bath liquid.

4. The process of claim 1, wherein said liquid comprises a liquid selected from water and cooking oil.

5. The process of claim 1, wherein said liquid comprises water.

6. The process of claim 1, comprising separately heating laterally adjacent zones of said bath and vertically perturbating said bath liquid to maintain said bath liquid at said controlled temperature.

7. The process of claim 6, wherein said bath liquid is vertically perturbated with bubbles.

8. The process of claim 1, comprising adding liquid to said bath without causing greater than 2° F. variations within the entire volume of said bath liquid.

9. The process of claim 1, comprising maintaining said bath liquid at said temperature within a vessel having a plurality of spaced apart temperature sensors.

10. The process of claim 1, wherein at least one heat conductive member is inserted into said proteinaceous food product before immersing the proteinaceous food material in the bath liquid.

11. The process of claim 1, wherein said heat treating comprises tenderizing said proteinaceous food product at a controlled temperature below a minimum cooked temperature of the prozeinaceous food material for a sufficient time to carry out endogenous enzymatic tenderization of the proteinaceous food product.

12. The process of claim 11, wherein said proteinaceous food product is beef and said controlled temperature is maintained to be less than 135° F. and within a range of ±1° F.

13. The process of claim 11, wherein said proteinaceous food product is selected from the group consisting of veal, lamb, pork and poultry and said controlled temperature is maintained to be less than 160° F. and within a range of ±1° F.

14. The process of claim 1, wherein said heat treating process comprises pasteurizing said proteinaceous food product.

15. The process of claim 14, wherein said proteinaceous food product is a poultry shell egg.

16. The process of claim 15, comprising vertically perturbating said liquid to disrupt temperature stratification.

17. The process of claim 14, wherein said proteinaceous food product is a food product other than shell eggs.

18. The process of claim 17, wherein said proteinaceous food product is meat.

19. The process of claim 18, wherein said meat is poultry meat.

20. The process of claim 17, wherein said proteinaceous food product is seafood.

21. The process of claim 20, wherein said seafood is shellfish.

22. The process of claim 1, wherein said temperature is at least 130° F.

23. The process of claim 1, wherein said temperature is at least 135° F.

24. The process of claim 1, wherein said controlled temperature is maintained within a range of ±1° F.

25. The process of claim 1, wherein said controlled temperature is maintained within a range of ±0.75° F.

26. The process of claim 1, wherein said controlled temperature is maintained within a range of ±0.5° F.

27. The process of claim 26, wherein said food product is poultry shell eggs heat treated by said process on a commercial scale.

28. The process of claim 26, wherein said process is a continuous heat treating process.

29. A process for pasteurizing a shell egg, comprising immersing the shell egg in a bath liquid and separately heating laterally adjacent zones of said bath to maintain the entire volume of said bath at a controlled temperature.

30. The process of claim 29, further comprising vertically perturbating said bath liquid to disrupt temperature stratification.

31. The process of claim 29, comprising adding liquid to said bath without thereby causing greater than 2° F. variations within the entire volume of the bath liquid.

32. The process of claim 29, wherein said controlled temperature is maintained within a range of ±2° F.

33. The process of claim 29, comprising maintaining said bath liquid at said temperature within a vessel having a plurality of spaced apart temperature sensors.

34. A process of heat treating a proteinaceous food product, said process comprising:

immersing the product in a liquid bath containing a liquid; and maintaining an entire volume of said bath liquid at a controlled temperature within a temperature variation of ±2° F. to heat treat said proteinaceous food product without cooking said food product.

35. The process of claim 34, wherein said bath includes laterally adjacent zones and further comprises:

separately heating said liquid in said laterally adjacent zones of said bath; and vertically perturbating said liquid to maintain said entire volume of said liquid at said controlled temperature below a minimum cooked temperature of said food product without ever exceeding said minimum cooked temperature in said bath.

36. The process of claim 34, wherein temperature of said entire volume of said liquid of said bath is maintained below a minimum cooked temperature of said food product without ever exceeding said minimum cooked temperature in said bath.

37. The process of claim 34, wherein said maintaining step kills bacteria.

38. The process of claim 34, further comprising vertically perturbating said liquid of said bath to maintain said entire volume of said bath at said controlled temperature.

39. The process of claim 38, wherein bubbles are used to cause said vertical perturbation.

40. A process for pasteurizing a proteinaceous food product, comprising:

(A) immersing the food product in a bath liquid where the bath liquid contacting the immersed food product is at a predetermined temperature between 125° F. and 140° F., (B) heating the bath liquid to maintain the predetermined temperature, and (C) vertically perturbating the bath liquid sufficient with a liquid jet or air bubbles that the bath liquid contacting the food product is maintained within ±2° F. of said predetermined temperature.

41. The process of claim 40, wherein said food product comprises shell eggs.

* * * * *